US006465777B1

(12) United States Patent
Rache

(10) Patent No.: US 6,465,777 B1

(45) Date of Patent: Oct. 15, 2002

(54) METHOD AND APPARATUS FOR THERMALLY STABILIZING FLIGHT TIMES IN TIME-OF-FLIGHT MASS SPECTROMETERS

(75) Inventor: Horst Rache, Delmenhorst (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 09/336,909

(22) Filed: Jun. 21, 1999

(30) Foreign Application Priority Data

Jun. 23, 1998 (DE) ........................................ 198 27 841

(51) Int. Cl.[7] .......................... H01J 49/00; H01J 49/40; B01D 59/44

(52) U.S. Cl. ....................... 250/287; 250/281; 250/282; 250/288

(58) Field of Search ................................ 250/287, 291, 250/292, 281, 282, 288

(56) References Cited

U.S. PATENT DOCUMENTS 4,344,320 A * 8/1982 Haupt et al. ................. 73/40.7
4,709,148 A * 11/1987 Meddings ................... 250/292
5,307,139 A * 4/1994 Tyson, II et al. .......... 356/35.5
5,316,077 A * 5/1994 Reichard ............... 165/104.28
6,049,077 A * 4/2000 Franzen ...................... 250/287

FOREIGN PATENT DOCUMENTS

| | | | |
|---|---|---|---|
| GB | 2170930 | A | 8/1986 |
| GB | 2329066 | A | 3/1999 |
| WO | WO 98/56029 | A1 | 12/1998 |

OTHER PUBLICATIONS

Hewlett–Packard Company; The HP G2030A MALDI–TOF MS System; A Simple Solution To Comprehensive MALDI–TOF MS Analysis; 1995.

* cited by examiner

*Primary Examiner*—John R. Lee
*Assistant Examiner*—David A. Vanore

(57) ABSTRACT

In a time-of-flight mass spectrometer, the entire flight tube, which is generally manufactured of stainless steel due to the necessary vacuum characteristics and is subject to a relatively high degree of thermal expansion, together with the spectrometer electronics is enclosed in an electromagnetic shielding box. A flow control mechanism, which can consist of a fan, draws air over the electronics, heating the air. The heated air is then admixed with fresh air and drawn over the flight tube maintaining it very precisely at a constant temperature. In addition, the electronics may also be kept at a constant temperature by a separate air stream guidance and control mechanism.

11 Claims, 1 Drawing Sheet

METHOD AND APPARATUS FOR THERMALLY STABILIZING FLIGHT TIMES IN TIME-OF-FLIGHT MASS SPECTROMETERS

FIELD OF THE INVENTION

This invention relates to time-of-flight mass spectrometers which must keep ass flight times highly constant to preserve calibrated mass scaling, even under varying ambient temperatures.

BACKGROUND OF THE INVENTION

Compared to other mass spectrometers, the functioning of time-of-flight mass spectrometers can be very easily understood, even though in detail this category of instruments is similarly complicated. The ions of the analyte substance to be analyzed, formed by pulse type ion source in a very short time span of only a few nanoseconds, are all accelerated to the same energy for each ion charge within relatively short acceleration fields. They then fly through a field-free flight path and are measured at its end by an ion detector with high time resolution as a temporally variable ion current. The flight time of the various ion types can be determined from the measurement signals of the ion current.

Using the very simple basic equation for the kinetic energy of ions with e as the elementary charges:

$$E=\frac{1}{2}m\,v^2/e, \qquad (1)$$

the ratio m/e from mass m to charge e can be determined at equal energy E of all ions from their velocity v. The velocity v of the ions is obtained, as indicated above, in a flight tube of length L by measurement of the flight times t of the ions using the equation:

$$v=L/t. \qquad (2)$$

It is therefore a simple matter to calculate the ratio of mass m to charge e from the flight time:

$$m/e=2Et^2/L^2=c\times t^2. \qquad (3)$$

For very precise determination of the ion mass, the above indicated equations become more complicated since the ions in the ion source unavoidably receive initial energies from the ionization process before their electrical acceleration. These energies change the equation (3) slightly, but very decisively for precise mass determinations. In this way, the relationship between the mass m and the square of the flight time $t^2$ becomes slightly nonlinear. This relationship is therefore normally determined by experiment and saved on the spectrometer's computer for future mass determinations as a so-called "mass scale."

The term "mass scale" is understood here to mean the assignment by a connected computer system of the flight times determined from the measurement signals to the masses of the ions (more precisely: the mass-to-charge ratios). This mass scale is calibrated using a special method by means of precisely known reference substances and should remain stable for as long as possible without recalibration.

A large number of influences generally affect the stability of the calibrated mass scale: inconstancy of the high voltages for acceleration of the ions, changing distances between the acceleration diaphragms in the ion source caused by mounting of the sample support introduced into the vacuum, changing initial energies of the ions caused by the ionization process and, not least, the thermal alterations in the length of the flight path.

Therefore, for highly precise measurements of the masses of an analyte substance, the mass of a reference substance is also measured within the same mass spectrum. The reference substance must be added to the analyte substance (so-called measuring method with an "internal reference"). If the calculated mass of the reference substance deviates from the true known value, the mass calculated for the analyte ions can then be corrected in a known manner (refer for example to application DE 196 35 646).

Unfortunately, the various influences on the mass determination nevertheless end up with different correction functions for the mass. Alterations of the high voltage, for example, cause a proportional change in the energy E of the ions, which according to equation (3) enter into the mass calculation linearly, i.e. mass proportionally. Changes to the flight length L, however, enter into the mass calculation according to equation (3) proportional to the root of the mass. If the reference mass and analyte mass are very different, it is no longer possible to make a successful correction without precise knowledge of the type of influence. For very similar masses of analyte and reference substance, it is still possible to make corrections with relatively good success. Today, mass accuracies of about 30 parts per million (ppm) are achieved using high performance time-of-flight mass spectrometers in respect to reference substances not contained in the analyte sample ("method with external reference"). Using reference substances which are added to the analyte sample ("internal reference"), accuracies of 10 ppm are achieved. Today, however, mass accuracies of 1–5 ppm are the target of protein chemists and other users, and are correspondingly demanded by the manufacturers of mass spectrometers.

The stainless steel flight tubes standard today, which determine the distance between the ion source and ion detector, have linear coefficients of thermal expansion of about $\alpha=13\times10^{-6}K^{-1}$. The more seldomly used Duralumin even demonstrates an expansion of $\alpha 23\times10^{-6}K^{1}$. Since the relationship $$dm/m=-2dL/L \qquad (4)$$

can be derived from equation (3), a temperature change produces an apparent change in mass of about 26 ppm per centigrade (or Kelvin) due to the expansion of the stainless flight tube. Compared to the target of 1–5 ppm for the mass accuracy, that is an extremely large amount. Even if mass reference substances contained in the sample are used, the targeted accuracies cannot be achieved. Therefore today, in the case of highest demands on the accuracy of the mass determination, a temperature-dependent mass calibration is required which is, however, very complicated to perform and demands very precise temperature measurement at a good constancy of ambient temperature.

The ambient temperature in non-air-conditioned rooms varies by more than 10 degrees Celsius. These temperature fluctuations are transferred relatively quickly to the, in most cased openly exposed flight tubes of relatively thin-walled stainless steel, but due to the flange-mounted pumps, temperature distribution is very irregular along the length of the flight tube.

However, even greater difficulties are, caused by today's strict requirements for electromagnetic compatibility (EMC). This, in conjunction with necessary pulse methods for ion generation and pulse-switched high voltages, means that at least parts of the mass spectrometer's flight tube;, including the electronics, have to be installed in a hermetically sealed housing. Through the heating of the vacuum pumps and the electronics, flight tube temperature increases of up to 20 degrees Celsius must be reckoned with in spite of fan cooling. Without appropriate consideration or compensation, this corresponds to an apparent mass change of about 500 ppm for measurements during the start-up phase of the instrument. But even if equilibrium is achieved, thermal fluctuations remain within the range of about 10 Kelvin and correspond to apparent, relative mass changes of 260 ppm. On the other hand, the use of cooling water is undesirable today for ecological and financial reasons. Even for measuring methods using an internal reference, difficulties arise here in deciding on application of the right correction.

For routine analyses with tens of thousands of samples daily, such as are expected for DNA analyses, a mass determination with internal reference is too complex, since each individual sample requires the addition of reference substances which are similar in their mass to the mass of the analyte to be measured. For these methods (which are not however subject to the extreme demands on the accuracy of mass determination cited above), the target is to keep all operating parameters as constant as possible so as to perform the mass determination without internal reference substances and achieve a long period of validity for mass calibration.

Controlled temperature stabilization of the flight tube, including the ion source and detector, is an apparently simple solution to this problem of correct mass determinations in spite of changes in the ambient temperatures. This would have to be ±1/10 Kelvin according to the above mentioned strict requirements on mass constancy. Due to the standard flight tube length of one and a half to two meters and flight tubes which until now are at least partially exposed to ambient temperature, installation of controlled temperature stabilization is not simple and has therefore also not yet been done. The heating must be uniform along the entire flight tube, and this increases the energy consumption of the spectrometer in an undesirable way.

The solution mentioned above, using temperature-dependent calibration of the mass scale, has already been applied but is very complicated. It could be automated by automatic measurement of the temperature, although this solution has also not yet been verified. Temperature-dependent calibration is made difficult by the fact that the flight tube usually exhibits temperature gradients along the axis due to irregular heating or cooling when temperature changes occur.

Compensation for the linear expansion of flight tubes and the associated changes in flight time by means of temperature-controlled regulation of the voltages is not possible, as noted above, due to the various types of functional effects on the mass scale.

Control of the distance between the ion source and detector by means of electromechanical actuators seems possible, however it has also not yet been introduced. To do this, either a very precise length measurement is necessary or more simply—the use of reference substances which, however, need not be scanned in the same spectrum and thus can be added separately from the ion source ("external reference").

Nevertheless, all these solutions demand relatively complicated controls which always complicate the function of the mass spectrometer and make its operation more expensive.

The market for mass spectrometers is currently undergoing extreme change. Mass spectrometers are penetrating into new application areas where they are increasingly being used by personnel, untrained in mass spectrometry, as their normal working tool. They must therefore be easy and uncomplicated to operate, since critical selection of correction possibilities for the results is no longer possible. On the other hand, more attention is being paid to inexpensive acquisition and operation. The mass spectrometers must therefore be designed as simply as possible and require minimal power or other materials, such as reference substances.

It is the objective of the invention to design a time-of-flight-mass spectrometer in such a way that, when unavoidable changes in the ambient temperature occur, the flight length remains constant, so that in spite of changes in the ambient temperature, there is no change in the relationship between the flight time and mass beyond tolerances to be determined on a task-specific basis. The design should be simple and inexpensive to manufacture, and not lead to increased use of auxiliary materials.

SUMMARY OF THE INVENTION

In accordance with the principles of the invention the flight tube is incorporated completely into the electromagnetic shielding housing and the waste air from the cooling of the electronics is drawn over the flight tube and used to thermostatize the flight tube. The flight tube is thereby kept at a constant temperature over its entire length by means of favorable guidance of the waste air in conjunction with control of the air stream. The waste air from cooling the laser, and possibly that from the pumps too, may also be drawn over the flight tube and used to stabilize the flight tube.

In one embodiment, the air stream may be controlled, for example, in a simple manner by controlling the fan power. The temperature of the flight tube can be measured by one or more temperature probes, for which large sensors, such as strain gauges, are especially suitable. However, a direct length measurement of the distance between the ion source and the ion detector, for example using an inexpensive laser interferometer, can also be used for control.

In accordance with another embodiment, within the shielding box, the electronics can be separately subjected to similar thermostatizing by guidance and control of the cooling air stream to also ensure particular constancy of the high voltages. This cooling air control may reduce the constancy of high voltage control from about 10 ppm to about 2 ppm.

In still another embodiment, for extremely high power mass spectrometers, length compensation of the flight path can additionally be integrated by using well-known thermo-compensating structures

BRIEF DESCRIPTION OF THE DRAWINGS

The above and further advantages of the invention may be better understood by referring to the following description in conjunction with the accompanying drawings in which.

DETAILED DESCRIPTION

Figure 1:
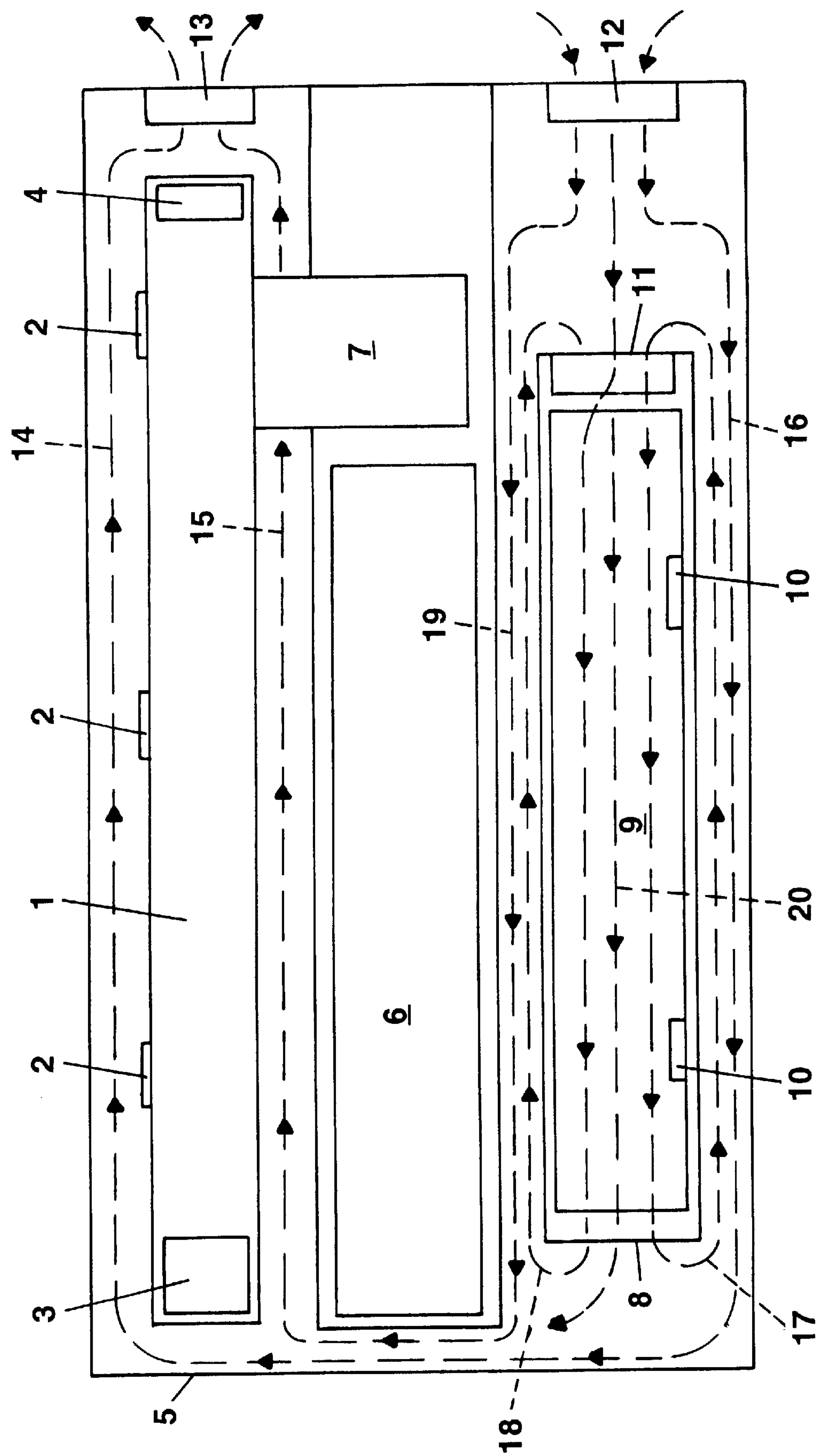
FIG. 1 is a block diagram of an arrangement in accordance with this invention showing a high-frequency electrical shielding box containing electronics in which a flight tube is located so that heat produced by the electronics thermally stabilizes the flight tube.

An illustrative embodiment is shown in FIG. 1. The flight tube (1) with temperature sensors (2) is in the uppermost compartment of a electromagnetic shielding box (5) divided internally into three sections for the entire mass spectrometer and is kept at a constant temperature of about 30 degrees Celsius by a temperature-controlled fan (13), which draws in the waste air from the electronics (9) through this compartment. In the middle compartment, in this embodiment, is the pulse laser (6) and the high vacuum pump (7), which are cooled with their own cooling air circuit, not shown here.

In the lower compartment is the electronics (9) with its own temperature sensors (10), enclosed in an internal electronic screening box (8) and with its own fan (11). The cooling air for the electronics (9) is drawn by fan (13) through a dust filter (12) from the surrounding air at ambient temperature into the lower compartment.

A portion of the cooling air as indicated by arrows (17) (18) (20) is driven through the electronic shielding box 8 by the fan (11) and is heated due to heat dissipation from the electronics, which is about 300 watts. The remainder of the aor as indicated by arrow (19) passes over the shielding box (8). If the external air is very cold, the upper ventilator (13) will draw in only a little cooling air. In this case the fan (11) will create an air recirculation through the electronics (9) in the lower section until it is sufficiently heated up as indicated by arrows (17) and (18).

The control of the electronic fan (11) also keeps the electronics at a constant temperature, here about 35 degrees Celsius, by means of the temperature sensors (10). The heated air now flows into the upper compartment as indicated by arrows (14) and (15) and passes along the flight tube drawn by the fan (13) in the upper compartment, which is controlled by the temperature sensors (2) and forcing the waste air outside.

However, the flight tube need not absolutely have temperature sensors; instead, the critical distance between the ion source and detector may also be measured in another manner and this can be used to control the waste air stream. This distance can, for example, be measured by a small and inexpensive laser interferometer that is integrated into the vacuum unit. The precision of such laser interferometers is currently about 5 micrometers, which corresponds to a mass accuracy of 10 ppm for 1 meter of flight length:, or 5 ppm for 2 meters of flight length. It is to be expected that the measuring accuracy of such inexpensive laser interferometers will increase. Even an occasional, but somewhat regularly interspersed measurement of a reference substance can be used for control since the temperature changes in the flight tube are relatively sluggish in this control path.

If the high voltage temperature drifts are sufficiently well stabilized, the thermostatizing of the electronics can of course be omitted. Generally, however, high voltage fluctuations decrease by a factor of 5 to 10 if the electronics are temperature controlled. However, temperature control is only practical if there are no strong load fluctuations. Since the the electrical fields in the mass spectrometer essentially consumes no power, the voltage dividers for the production of component voltages represent the primary consumers of active power, and therefore there are absolutely no load fluctuations. On the other hand, a temperature control is especially effective here since voltage distributors commonly display critical temperature drifts.

The thermostatizing of the flight tube can also be generated by mixing a portion of fresh air with the waste air stream through a controlled valve, in order to keep the waste air in the area of the flight tube at a temperature which causes the thermostatizing. Conversely, a varying amount of waste air can be mixed with fresh air flow from a fan, while the remaining waste air is forced outside.

It is possible to achieve a particularly good length constancy for the flight path if passive length compensation of the path is performed between the ion source and detector by means of a combination of materials of varying linear expansion.

Any specialist in the field of time-of-flight mass spectrometers will also be able to draft and produce more complicated designs of very inexpensive spectrometers using the basic principles indicated here, such that a constancy of the mass scale is provided even with changes in the ambient temperature.

What is claimed is:

1. A time-of-flight mass spectrometer for precise mass determinations of ions by measurement of their flight time, comprising:

at least one flight tube;

spectrometer electronics;

a housing enclosing the flight tube and the electronics; and a flow control mechanism which guides air through the housing over the electronics and then over the flight tube to thermostabilize the flight tube.

2. A time-of-flight mass spectrometer according to claim 1, wherein further comprising vacuum pumps and a laser located in the housing and the flow control mechanism guides air over the vacuum pumps and the laser and then over the flight tube.

3. A time-of-flight mass spectrometer according to claim 1, wherein the flight tube is equipped with at least one temperature sensor having an output signal that is input to the flow control mechanism.

4. A time-of-flight mass spectrometer according to claim 3, wherein the temperature sensor comprises a strain gauge.

5. A time-of-flight mass spectrometer according to claim 1, wherein a length measurement unit is located in the flight tube and a signal indicative of ion path length is output by the length measurement unit to the flow control mechanism.

6. A time-of-flight mass spectrometer according to claim 5, wherein the length measurement unit comprises a laser interferometer.

7. A time-of-flight mass spectrometer according to claim 1, further comprising at least one fan which draws ambient air into the housing, over the electronics which heat the air and then over the flight tube as waste air.

8. A time-of-flight mass spectrometer according to claim 1, wherein the flow control mechanism comprises at least one fan and a power control unit for controlling the fan.

9. A time-of-flight mass spectrometer according to claim 1, wherein the flow control mechanism also draws ambient air into the housing and mixes the ambient air with air drawn over the electronics so that that flight tube temperature is controlled by an admixture of fresh air and heated air drawn over the electronics.

10. A time-of-flight mass spectrometer according to claim 1, further comprising a second fan which controls air passing over the electronics so that the electronic can be independently thermostabilized.

11. A time-of-flight mass spectrometer according to claim 1, wherein the flight tube comprises an ion source and ion detector and the spectrometer further comprises a thermo-compensating spacing structure made of materials with different degrees of thermal expansion which modifies the flight length between the ion source and the ion detector so that the flight length is kept constant during temperature changes.

* * * * *